C. C. LEIBINGER & P. T. LOGAN.
MACHINE FOR WASHING CONTAINERS.
APPLICATION FILED MAR. 17, 1915.

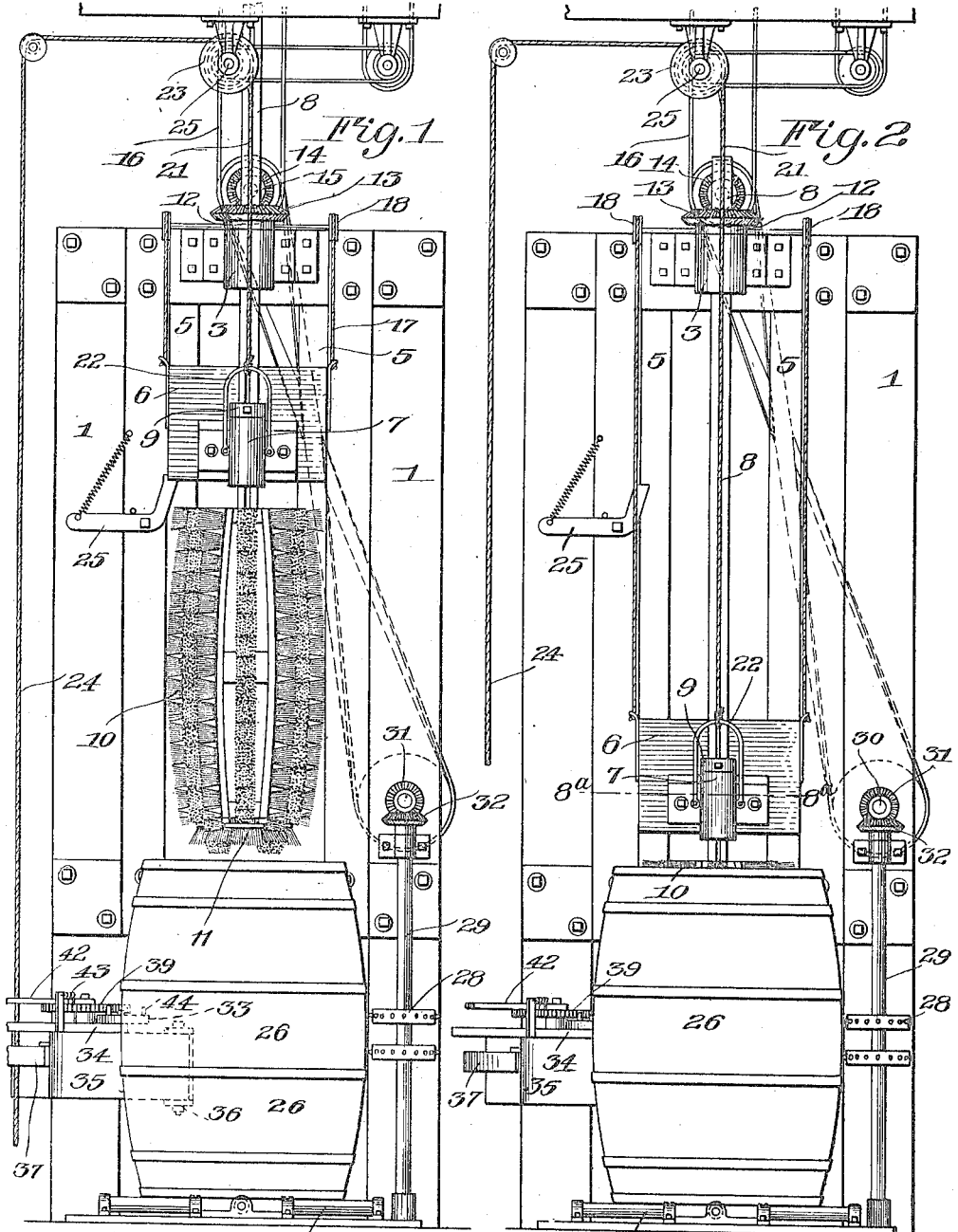

1,206,447.

Patented Nov. 28, 1916.
4 SHEETS—SHEET 2.

WITNESSES:
Nelson H. Opp
H. E. Stonebraker

INVENTORS
Charles C. Leibinger
Patrick T. Logan
BY
their ATTORNEYS

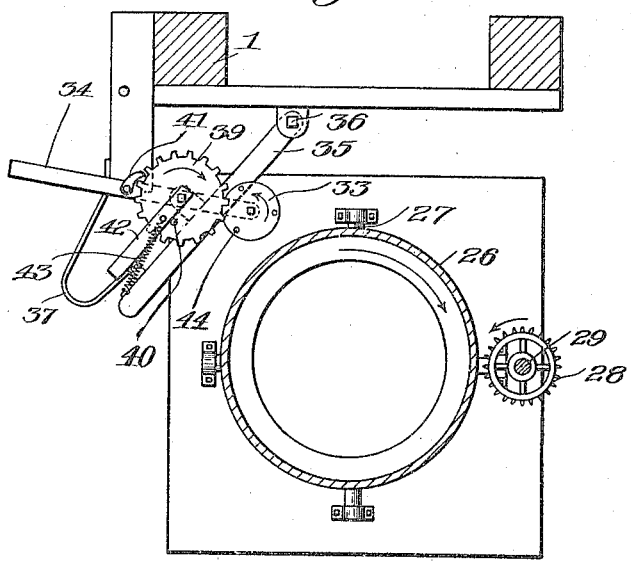
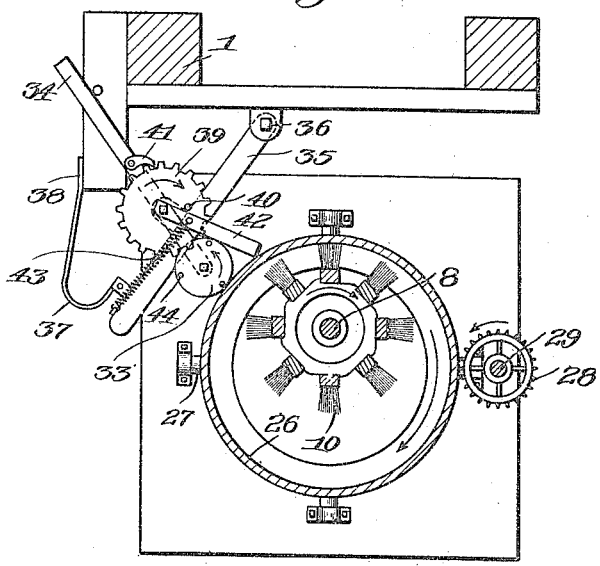

C. C. LEIBINGER & P. T. LOGAN.
MACHINE FOR WASHING CONTAINERS.
APPLICATION FILED MAR. 17, 1915.

1,206,447.

Patented Nov. 28, 1916.
4 SHEETS—SHEET 4.

WITNESSES:
Nelson H. Copp
H. E. Stonebraker

INVENTORS
Charles C. Leibinger
Patrick T. Logan
BY
Church & Rich
their ATTORNEYS

UNITED STATES PATENT OFFICE.

CHARLES C. LEIBINGER AND PATRICK T. LOGAN, OF ROCHESTER, NEW YORK.

MACHINE FOR WASHING CONTAINERS.

1,206,447.   Specification of Letters Patent.   Patented Nov. 28, 1916.

Application filed March 17, 1915.   Serial No. 14,975.

*To all whom it may concern:*

Be it known that we, CHARLES C. LEIBINGER and PATRICK T. LOGAN, of Rochester, in the county of Monroe and State of New York, have invented certain new and useful Improvements in Machines for Washing Containers; and we do hereby declare the following to be a full, clear, and exact description of the same, reference being had to the accompanying drawings, forming a part of this specification, and to the reference-numerals marked thereon.

Our invention relates to machines for washing containers such as barrels, casks or similar hollow structures and it has for its object to provide a practical machine that can be economically constructed and is characterized by a high degree of efficiency as regards speed of operation and thoroughness of work.

A further purpose of the invention is to make the operation automatic to the extent of determining the period of engagement between the cleaning member and the container by preliminary adjustment, thereby having it possible to subject each container to precisely the same cleaning operation.

A further purpose of the improvement is to facilitate the operation of the machine by affording a ready controlling mechanism for the cleaning member so that it can be easily positioned in operative relation to the container and withdrawn at the completion of each operation.

To these and other ends the invention resides in certain improvements and combinations of parts all as will be hereinafter more fully described, the novel features being pointed out in the claims at the end of the specification.

Figure 3:
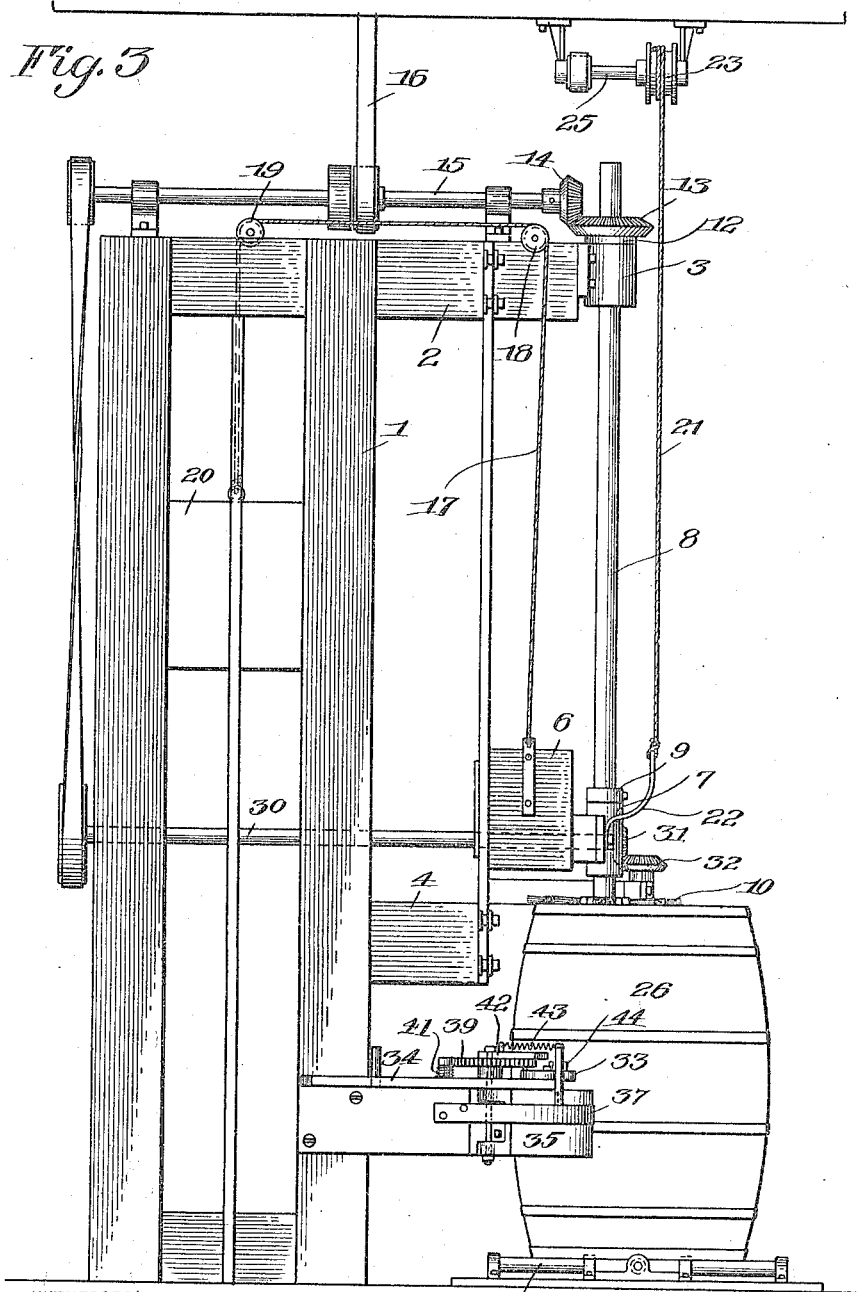
Figure 5:
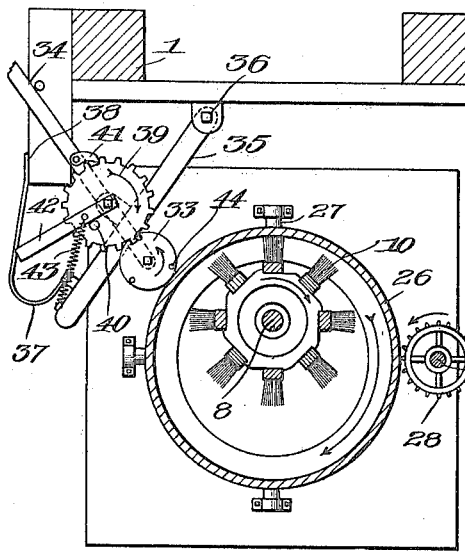
Figure 7:
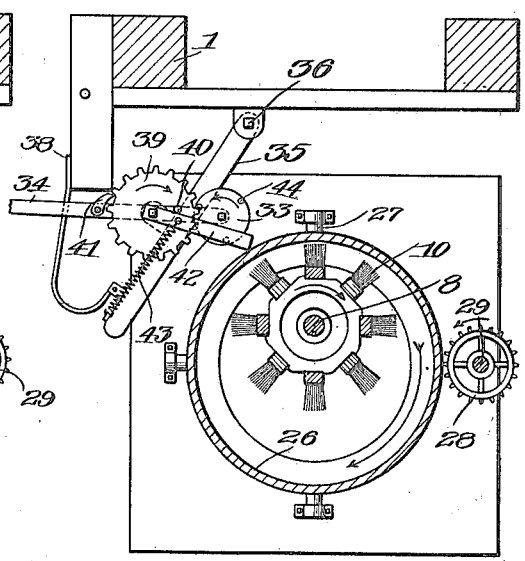
Figure 8:
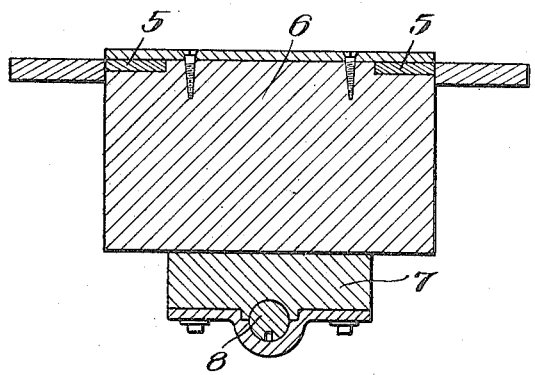

In the drawings: Figure 1 is a front view illustrating an embodiment of the invention in one of its preferred forms with the cleaning member elevated above a container, preparatory to cleaning the latter; Fig. 2 is a similar view showing the cleaning member lowered into the container; Fig. 3 is a side elevation with the cleaning member in lowered position; Fig. 4 is a detail view illustrating the position of the automatic mechanism which effects operative disengagement of the container and cleaning member after a predetermined period, and showing the parts in the preliminary position where they are held during adjustment of the container; Fig. 5 is a sectional view showing the position of the parts at the beginning of the operation; Fig. 6 is a similar view showing the position of the parts immediately prior to the operation of the kick-out means which releases the positioning member from engagement with the container; Fig. 7 is a similar view after the kick-out means has been operated, and Fig. 8 is a horizontal sectional view on the line 8ª—8ª of Fig. 2.

Similar reference numerals throughout the several figures indicate the same parts.

Our invention is susceptible of various applications and as illustrating one possible and preferred manner of carrying it out, we have shown an organization in connection with a machine for washing and scrubbing barrels and like containers and in the form of construction about to be described, the cleaning member embodies a rotary brush that is actuated while in engagement with the container, the latter being automatically disengaged from the cleaning member after a predetermined period, thus preventing a careless workman from over washing one container while not sufficiently washing another, and it will be understood that the invention is not to be restricted to the precise arrangement or manner of coöperation of the several elements of the machine as shown.

In the present construction, 1 designates a frame which supports the cleaning member in the following manner: 2 are arms provided with a bearing 3, and 4 are extensions which support the guides 5 and arranged for vertical sliding movement on the latter is a block 6 provided with a bearing 7. 8 is a spindle arranged in the bearings 3 and 7 and carrying a fixed collar 9 disposed above the bearing 7 so that when the block 6 is elevated, the spindle 8 will be correspondingly moved. The spindle 8 carries a brush designated generally as 10 which is preferably curved longitudinally to conform to the surface of the ordinary barrel. The brush 10 includes an independently movable head 11 which is loosely mounted so as to permit it to adjust itself to any unevenness of the closed end of the container. The spindle 8 is vertically movable in the bearing 3 and is driven by a collar 12 splined thereon and carrying a bevel gear 13 engaged by a pinion 14 on the shaft 15 which may be operated by a belt 16 from any suitable source of power. 17 are cables or connections leading from the block 6 around guide pulleys 18 and 19 to a counter balance 20, and 21 is a rope or cable connected to an arm 22 secured on the bearings 7 and extending preferably twice around a pulley 23, having its opposite end 24 within reach of the operator. The pulley 23 is fixed on a constantly driven shaft 25 and when sufficient tension is applied to the end 24 of the cable, it grips the pulley 23 with sufficient friction to elevate the block 6 together with the spindle 8 and cleaning member, lifting the latter out of the container to the position shown in Fig. 1 where it is held by a spring-controlled latching member 25. The container is designated at 26, resting upon rollers 27, and held in engagement in a manner which will presently be described with driving means in the form of toothed wheels 28 which are mounted on a vertical shaft 29. The latter may be operated in any desirable manner, this being preferably accomplished by a shaft 30 driven from main shaft 15 and operating the vertical shaft 29 through pinions 31 and 32.

One of the chief difficulties heretofore experienced in the operation of barrel washing machines has been that of properly timing the period of operative relation between the container and the cleaning member and it has been necessary to rely entirely on the judgment of the operator to accomplish this, the result being that in many instances, the container is not properly cleaned while in other cases, the cleaning operation is extended over a longer period than is necessary. This is overcome in the present structure by automatic devices which serve to position the container while subjected to the operation of the cleaning member and subsequently act to permit its release from engagement with the cleaning member. The automatic means referred to includes a driven member or disk 33 mounted on a lever 34 which is pivoted on a carrier 35, the latter being pivotally secured to the frame at 36 and connected to a leaf spring 37 fixed on the frame at 38 and which acts to force the carrier inwardly toward the container and thus hold the disk 33 in engagement with the container. Mounted on the same axis with the lever 34 is a toothed wheel or gear 39 carrying a pin 40 and engaged by a pawl 41 which is pivotally mounted on the lever 34. Also mounted on the same axis is a kick-off device or arm 42 connected by a spring 43 with the carrier 35 and adapted to engage the pin 40 as shown in Fig. 5. The disk 33 carries a series of pins 44 which engage the teeth of the wheel 39 and thus effect rotation of the latter intermittently. The pins 44 are removable in order to increase or decrease the period of operation which is controlled thereby in the manner that will now appear. In the normal operation of the parts, the driving means 28 and the driven member 33 have their axes on the same side of the axis of the container as the cleaning member which is located eccentrically, and the driven means thus acts as a positioning member, when engaged with the container, to hold the latter against the brush.

To position a barrel the operator grasps the lever 34, moving the parts to a position like shown in Fig. 4 and holding them in such position until the barrel is positioned. The parts are then released and actuated toward the barrel by means of the spring 37. The lever 34 is then moved to a position such as shown in Fig. 5, and the parts are then ready for the cleaning operation. The brush is lowered into the container by releasing the latching member 25, the lowering movement being controlled by the rope 24 which when loose permits the brush to drop freely. With the parts positioned as shown in Fig. 5, as the container is rotated the disk 33 moves in the opposite direction, and through the pins 44 actuates the wheel 39. The latter carries around the kick-off device 42 by means of the pin 40, and when the pin 40 has moved the kick-off device to a position where the line of centers of the extremities of the spring 43 is positioned to the right of the pivot of the kick-off device 42, the latter swings at once to the position shown in Fig. 6, actuated by the spring 43. The wheel 39 follows the kick-off device around by an intermittent motion, and finally the pin 40 again engages the kick-off device 42 when the parts are positioned, as shown in Fig. 6. Further movement of the disk 33 and wheel 39 forces the kick-off device against the container and causes the entire mechanism including the lever 34 to move bodily outwardly, assuming substantially the position shown in Fig. 7, in which position the disk 33 is moved away from the container and the latter is released from engagement with the cleaning member. The brush is then elevated by drawing on the rope 24, and the machine is ready for further operation.

We claim as our invention:

1. The combination with a cleaning member arranged to engage the inner surface of a hollow container and means for effecting relatively rotary movement of said parts, of devices operating to hold said container in contact with the cleaning member and automatically to permit relative movement bodily of the container and cleaning member transversely of their rotary axes after a predetermined period to effect disengagement of one from the other.

2. The combination with a cleaning member and means for retaining it in operative engagement with the inner surface of a hollow container, of devices operating to hold said container in contact with the cleaning member and automatically to permit relative movement bodily of the container and cleaning member in a direction laterally of the longitudinal axis of the container after a predetermined period to effect disengagement of one from the other.

3. The combination with a cleaning member and means for retaining it in operative engagement with the inner surface of a hollow container, of devices operating to hold said container in contact with the cleaning member and automatically to permit relative movement bodily between the container and cleaning member in a direction transversely of the longitudinal axis of the cleaning member after a predetermined period to effect disengagement of one from the other, and embodying adjustable means for varying the period of engagement between the cleaning member and container.

4. The combination with a cleaning member arranged to engage the inner surface of a hollow container and means for effecting relative rotary movement of said parts, of devices operating to hold said container in contact with the cleaning member and automatically to permit relative movement bodily of the container and cleaning member in a direction transversely of their rotary axes after a predetermined period to effect disengagement of one from the other, and embodying adjustable means for varying the period of engagement between the cleaning member and container.

5. The combination with a cleaning member and means for operating it in engagement with the inner surface of a hollow container, of devices operating to hold said container in contact with the cleaning member and automatically to permit movement of the container bodily away from the cleaning member in a direction transversely of the longitudinal axis of the container after a predetermined period.

6. The combination with a cleaning member and means for operating it in engagement with the inner surface of a hollow container, of devices operating to hold said container in contact with the cleaning member and automatically to permit movement of the container bodily away from the cleaning member in a direction transversely of the longitudinal axis of the container after a predetermined period, and embodying adjustable means for varying the time of engagement between the cleaning member and container.

7. The combination with a cleaning member and means for effecting relative rotation of it with the inner surface of a hollow container, of devices operating to hold said container in contact with the cleaning member and automatically to permit movement of the container bodily away from the cleaning member in a direction transversely of the longitudinal axis of the container after a predetermined period.

8. The combination with a cleaning member and means for effecting relative rotation of it in engagement with the inner surface of a hollow container, of devices operating to hold said container in contact with the cleaning member and automatically to permit movement of the container bodily away from the cleaning member in a direction transversely of the longitudinal axis of the container after a predetermined period, and embodying adjustable means for varying the time of engagement between the cleaning member and container.

9. The combination with a cleaning member and means for effecting rotation thereof, means arranged to engage a container and rotate it with its inner surface in engagement with the cleaning member and devices operating to hold said container in contact with the cleaning member and automatically to permit relative movement bodily between the cleaning member and container in a direction transversely of their longitudinal axes after a predetermined period, thereby effecting their disengagement.

10. The combination with a cleaning member and means for effecting rotation thereof, driving means arranged to engage a container and rotate it with its inner surface engaged with the cleaning surface, and devices operating to hold said container in contact with the cleaning member and automatically to permit movement of the container bodily with reference to the cleaning member in a direction transversely of the longitudinal axis of the container after a predetermined period.

11. The combination with a cleaning member and means for effecting rotation thereof, driving means arranged to engage a container and rotate it with its inner surface engaged with the cleaning member, and devices operating to hold said container in contact with the cleaning member and automatically to permit movement of the container bodily with reference to the cleaning member in a direction transversely of the longitudinal axis of the container after a predetermined period, and embodying adjustable means for varying the period of engagement between the cleaning member and the container.

12. The combination with a cleaning member and means for operating it in engagement with the inner surface of the hollow container, of a driving member engaging the container, and positioning means including a driven element or disk engaged by the container and operating to hold it in operative relation with the cleaning member, said disk governing a kick-out means at a predetermined time whereby the positioning means is moved to release the container from engagement with the cleaning member.

CHARLES C. LEIBINGER.
PATRICK T. LOGAN.

Witnesses:
NELSON H. COPP,
RUSSELL B. GRIFFITH.

Copies of this patent may be obtained for five cents each, by addressing the "Commissioner of Patents, Washington, D C."